(12) United States Patent
Na et al.

(10) Patent No.: US 12,487,568 B2
(45) Date of Patent: Dec. 2, 2025

(54) CHEMICAL DOSING OPTIMIZATION APPARATUS AND METHOD FOR WATER TREATMENT PLANT

(71) Applicant: DOOSAN ENERBILITY CO., LTD., Changwon-si (KR)

(72) Inventors: Sang Gun Na, Seoul (KR); Jae Hwa Kwak, Seoul (KR); Yeong Hyeok Kim, Seoul (KR); Jung Won Park, Gyeongju (KR); Young Geun Lee, Yongin (KR); Hyun Sik Kim, Gimpo (KR); Jun Woo Yoo, Seoul (KR)

(73) Assignee: DOOSAN ENERBILITY CO., LTD, Changwon-si (KR)

( * ) Notice: Subject to any disclaimer, the term of this patent is extended or adjusted under 35 U.S.C. 154(b) by 508 days.

(21) Appl. No.: 18/149,704

(22) Filed: Jan. 4, 2023

(65) Prior Publication Data
US 2023/0213898 A1  Jul. 6, 2023

(30) Foreign Application Priority Data
Jan. 6, 2022 (KR) .......... 10-2022-0002175

(51) Int. Cl.
*G05B 13/04* (2006.01)
(52) U.S. Cl.
CPC .................. *G05B 13/041* (2013.01)
(58) Field of Classification Search
CPC ...... G05B 13/041; G05B 13/04; B03D 1/028; B03D 1/1431; C02F 1/008; C02F 1/24;
(Continued)

(56) References Cited

U.S. PATENT DOCUMENTS 6,408,227 B1 * 6/2002 Singhvi ............... G05B 13/027
700/32
9,517,954 B2 12/2016 Konishi
(Continued)

FOREIGN PATENT DOCUMENTS

CN  111994970 A  11/2020
JP  2012213759 A  11/2012
(Continued)

OTHER PUBLICATIONS

Ryoichi Arimura, "Management Support System, Management Support Method and Management Support Program" (espacenet machine translation of JP2017140595A), Aug. 17, 2017, Espacenet Machine Translation (Year: 2017).*

(Continued)

*Primary Examiner* — Christopher W Carter
(74) *Attorney, Agent, or Firm* — Harvest IP Law, LLP

(57) ABSTRACT

A chemical dosing optimization apparatus includes a chemical dosing optimization part and a chemical dosing output control part, wherein the chemical dosing optimization part receives real-time data at least from a water treatment plant treating feed water by dosing a chemical and providing a treated water, analyzes the real-time data through a water treatment model in response to receiving the real-time data, derives a prediction value for predicting a state of the treated water of the water treatment plant, and derives a control value based on the prediction value through a controller, such that the control value is to set a minimum of a chemical dosage to be dosed in the feed water while the state of the treated water of the water treatment plant is maintained in a normal range, and wherein the chemical dosing output control part provides the control value to a water treatment control device.

17 Claims, 12 Drawing Sheets

(58) Field of Classification Search
CPC .. C02F 1/441; C02F 1/444; C02F 1/52; C02F 1/56; C02F 1/66; C02F 1/685; C02F 2103/08; C02F 9/00; C02F 1/5209; C02F 1/5245; C02F 2209/008; C02F 2209/02; C02F 2209/03; C02F 2209/05; C02F 2209/06; C02F 2209/11; C02F 2209/40; C02F 2209/42; G06N 3/006; G06N 3/084; G06N 3/08; B01D 35/28
See application file for complete search history.

(56) References Cited

U.S. PATENT DOCUMENTS

| | | |
|---|---|---|
| 2008/0046127 A1 | 2/2008 | Piironen |
| 2010/0243564 A1 | 9/2010 | Prasad |
| 2014/0279745 A1* | 9/2014 | Esponda ............... G06N 5/043 706/12 |
| 2015/0259230 A1* | 9/2015 | Li ........................ C02F 1/688 210/85 |
| 2017/0297929 A1 | 10/2017 | Whitaker |
| 2021/0039976 A1 | 2/2021 | Kiljunen |

FOREIGN PATENT DOCUMENTS

| | | |
|---|---|---|
| JP | 2017140595 A | 8/2017 |
| JP | 2020191999 A | 12/2020 |
| JP | 2021146246 A | 9/2021 |
| JP | 2021149472 A | 9/2021 |
| JP | 2021159870 A | 10/2021 |
| KR | 20160027815 A | 3/2016 |
| KR | 101889510 B1 | 8/2018 |
| KR | 1020210089211 A | 7/2021 |
| WO | 2020021688 A1 | 1/2020 |
| WO | 2021214755 A1 | 10/2021 |

OTHER PUBLICATIONS

EP EESR, dated May 24, 2023.
KR OA, dated May 28, 2024.

* cited by examiner

CHEMICAL DOSING OPTIMIZATION APPARATUS AND METHOD FOR WATER TREATMENT PLANT

CROSS REFERENCE TO RELATED APPLICATION

The present application claims priority to Korean Patent Application No. 10-2022-0002175, filed Jan. 6, 2022, the entire contents of which are incorporated herein for all purposes by this reference.

BACKGROUND OF THE INVENTION

1. Field of the Invention

The present disclosure relates to a chemical dosing optimization technology. More particularly, the present disclosure relates to a chemical dosing optimization apparatus and method for a water treatment plant.

2. Description of the Background Art

Pre-treatment of a seawater desalination plant uses chemicals, such as a pH control agent and a coagulant, at a stage before a dissolved air flotation (DAF) process in order to remove suspended materials such as solids. Existing methods rely on sampling experiments and operators' knowledge in order to dose appropriate chemicals, but it is difficult to perform control by applying real-time state changes in feed water, such as seawater, wastewater, etc.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing a chemical dosing optimization apparatus and method for a water treatment plant.

According to an exemplary embodiment of the present disclosure, there is provided a chemical dosing optimization apparatus including: a chemical dosing optimization part configured to receive real-time data at least from a water treatment plant treating feed water by dosing a chemical and providing a treated water, analyze the real-time data through a water treatment model in response to receiving the real-time data, derive a prediction value for predicting a state of the treated water of the water treatment plant, and derive a control value based on the prediction value through a controller, such that the control value is to set a minimum of a chemical dosage to be dosed in the feed water while the state of the treated water of the water treatment plant is maintained in a normal range; and a chemical dosing output control part configured to provide the control value to a water treatment control device.

The chemical dosing output control part may be configured to convert the control value according to a control period of the water treatment control device and a control range in each control period, and provide the control value resulting from conversion to the water treatment control device.

The apparatus may further include a postprocess protection part that is configured to analyze postprocess data including operating data and state data of a process resulting from a late-stage process and derive a correction bias value for preventing damage to the late-stage process. Herein, the chemical dosing output control part may be configured to correct the control value according to the correction bias value.

The apparatus may further include a chemical dosing management part that is configured to receive the real-time data including operating data and state data from the water treatment plant or the water treatment control device or both, and analyze the received real-time data to determine whether to perform a chemical dosing optimization process for optimizing the chemical dosage.

The apparatus may further include a data preprocessing part that is configured to preprocess the real-time data, and then provide the preprocessed real-time data to the chemical dosing optimization part.

The apparatus may further include: an automatic modeling processing part configured to design the water treatment model; and a model generation part configured to generate the water treatment model through training with training data extracted from raw data, the water treatment model simulating the water treatment plant and predicting the state of the treated water according to a state of the feed water for the water treatment plant.

The apparatus may further include a model selection part that is configured to use evaluation data collected from the water treatment plant to select the water treatment model having the highest similarity to the water treatment plant among a plurality of the generated water treatment models, and provide the selected water treatment model to the chemical dosing optimization part.

The water treatment model may be configured to receive data indicative of a state of the feed water and the chemical dosage derived by the controller, and calculate the prediction value for predicting the state of the treated water.

The controller may be configured to receive the prediction value predicted by the water treatment model, and calculate the chemical dosage considering a constraint limiting a range of the state of the treated water and an objective function for minimizing chemical dosing costs according to the prediction value.

According to an exemplary embodiment of the present disclosure, there is provided a chemical dosing optimization apparatus including: a model generation part configured to generate a water treatment model through training with training data extracted from raw data received at least from a water treatment plant treating feed water by dosing a chemical and providing a treated water, the water treatment model simulating the water treatment plant and predicting a state of the treated water according to a state of the feed water for the water treatment plant; and a chemical dosing optimization part configured to derive a prediction value for predicting the state of the treated water of the water treatment plant through the water treatment model, and derive a control value based on the prediction value through a controller, such that the control value is to set a minimum of a chemical dosage to be dosed in the feed water while the state of the treated water of the water treatment plant is maintained in a normal range.

The apparatus may further include a chemical dosing output control part that is configured to convert the control value according to a control period of a water treatment control device and a control range in each control period, and provide the control value resulting from conversion to the water treatment control device.

The apparatus may further include a postprocess protection part that is configured to analyze postprocess data including operating data and state data of a process resulting from a late-stage process and derive a correction bias value for preventing damage to the late-stage process. Herein, the chemical dosing output control part may be configured to correct the control value according to the correction bias value.

The apparatus may further include a chemical dosing management part that is configured to receive real-time data including operating data and state data from the water treatment plant or a water treatment control device or both, and analyze the received real-time data to determine whether to perform a chemical dosing optimization process for optimizing the chemical dosage.

The water treatment model may be configured to receive data indicative of the state of the feed water and the chemical dosage derived by the controller, and calculate the prediction value for predicting the state of the treated water.

The controller may be configured to receive the prediction value predicted by the water treatment model, and calculate the chemical dosage considering a constraint limiting a range of the state of the treated water and an objective function for minimizing chemical dosing costs according to the prediction value.

According to an exemplary embodiment of the present disclosure, there is provided a chemical dosing optimization method including: receiving real-time data by a chemical dosing optimization part; analyzing, by the chemical dosing optimization part, the real-time data through at least one water treatment model to derive a prediction value for predicting a state of treated water of a water treatment plant, and deriving a control value based on the prediction value through a controller, the control value being for dosing a minimum of a chemical dosage while the state of the treated water of the water treatment plant is maintained in a normal range; and providing the control value to a water treatment control device by a chemical dosing output control part.

In the providing of the control value to the water treatment control device, the chemical dosing output control part may convert the control value according to a control period of the water treatment control device and a control range in each control period, and may provide the control value resulting from conversion to the water treatment control device.

In the providing of the control value to the water treatment control device, a postprocess protection part may analyze postprocess data including operating data and state data of a process resulting from a late-stage process and may derive a correction bias value for preventing damage to the late-stage process and then the chemical dosing output control part may correct the control value according to the correction bias value.

The method may further include, before the receiving of the real-time data, receiving, by a chemical dosing management part, the real-time data including operating data and state data from the water treatment plant or the water treatment control device or both, and analyzing the received real-time data to determine whether to perform a chemical dosing optimization process for optimizing the chemical dosage.

The method may further include, after the determining of whether to perform the chemical dosing optimization process and before the receiving of the real-time data: preprocessing the real-time data by a data preprocessing part; and providing the preprocessed real-time data to the chemical dosing optimization part by the data preprocessing part.

The method may further include: before the receiving of the real-time data, extracting, by an automatic modeling processing part, training data including data for training and data for verification from a plurality of pieces of raw data accumulated and stored; and generating, by a model generation part, the water treatment model through training with the training data, the water treatment model simulating the water treatment plant and predicting the state of the treated water according to a state of feed water for the water treatment plant.

The method may further include: after the generating of the water treatment model, using, by a model selection part, evaluation data collected from the water treatment plant to select the water treatment model having the highest similarity to the water treatment plant among a plurality of the generated water treatment models; and providing the selected water treatment model to the chemical dosing optimization part by the model selection part.

In the deriving of the control value, the water treatment model may receive data indicative of the state of the feed water and the chemical dosage derived by the controller, and may calculate the prediction value for predicting the state of the treated water.

In the deriving of the control value, the controller may receive the prediction value predicted by the water treatment model, and may calculate the chemical dosage considering a constraint limiting a range of the state of the treated water and an objective function for minimizing chemical dosing costs according to the prediction value.

According to the present disclosure, chemical dosing optimization is performed through a water treatment model simulating the water treatment plant and a controller that is an optimization algorithm, so that costs of dosing chemicals into the water treatment plant can be minimized while water quality in a normal state is provided.

DETAILED DESCRIPTION OF THE INVENTION

Figure 1:
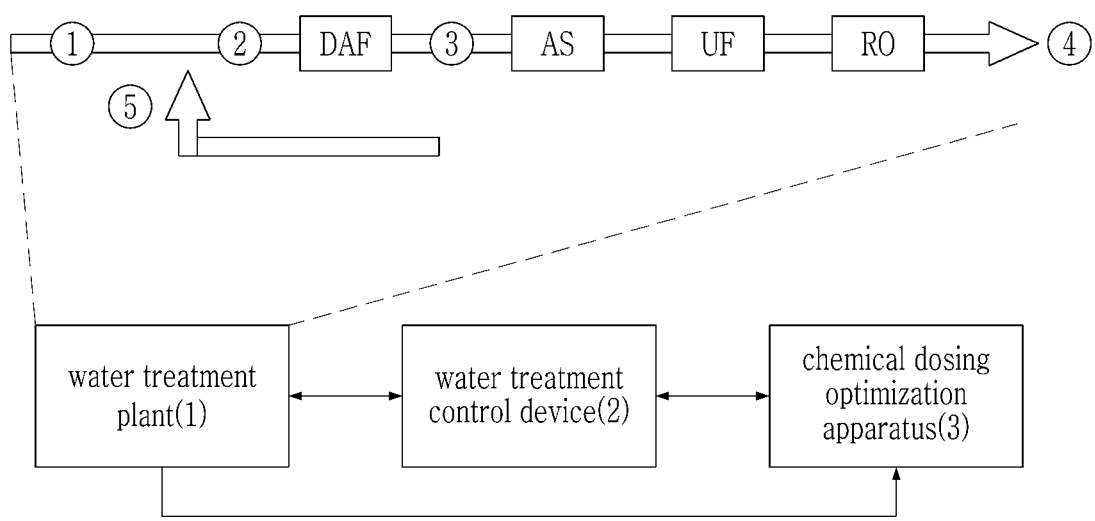
FIG. 1 is a diagram illustrating a configuration of a water treatment system according to an embodiment of the present disclosure.

The present disclosure may be modified in various ways and has various embodiments, so particular embodiments of the present disclosure will be illustrated and described in detail. However, the present disclosure is not limited thereto, and the exemplary embodiments can be construed as including all modifications, equivalents, or substitutes in a technical concept and a technical scope of the present disclosure.

The terms used in the present disclosure are merely used to describe the particular embodiments, and are not intended to limit the present disclosure. As used herein, the singular forms "a", "an", and "the" are intended to include the plural forms as well, unless the context clearly indicates otherwise. In the present disclosure, it is to be understood that terms such as "including", "having", "comprising" etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, exemplary embodiments of the present disclosure will be described in detail with reference to the drawings. Herein, it is noted that the same elements in the drawings are denoted by the same reference numerals. In addition, well-known functions and constructions that may obscure the gist of the present disclosure will not be described. For the same reason, some elements are exaggerated or omitted, or schematically shown in the drawings.

First, a water treatment system according to an embodiment of the present disclosure will be described. FIG. 1 is a diagram illustrating a configuration of a water treatment system according to an embodiment of the present disclosure. Referring to FIG. 1, the water treatment system according to an embodiment of the present disclosure includes a water treatment plant 1, a water treatment control device 2, and a chemical dosing optimization apparatus 3.

The water treatment plant 1 is for water treatment of treating feed water ① flowing into the water treatment plant 1 to suit an objective, and of discharging treated water ④. Examples of the water treatment include water treatment for a particular use, wastewater treatment, seawater desalination treatment, etc. The water treatment plant 1, according to an embodiment, includes a dissolved air flotation (DAF) device, an automatic strainer (AS), an ultrafiltration (UF) device, and a reverse osmosis (RO) device.

The DAF device treats the feed water ② according to dissolved air flotation. The automatic strainer (AS) removes solids remaining in the feed water ③ treated by the DAF device so as to prevent foreign substances from flowing in. The UF device includes a plurality of ultrafiltration units each having an ultrafiltration membrane. The UF device performs an ultrafiltration process in which the ultrafiltration membranes of the plurality of ultrafiltration units are used to filter out impurities remaining in the feed water ③. The UF device may pass treated water through the ultrafiltration membranes of the plurality of ultrafiltration units so as to filter out impurities remaining in the treated water. The RO device includes a plurality of trains each having a reverse osmosis membrane. The RO device performs a reverse osmosis process in which the reverse osmosis membranes of the plurality of trains are used to filter out impurities remaining in the feed water ③. The RO device passes the treated water through the reverse osmosis membranes of the plurality of trains to filter out impurities remaining in the feed water ③ according to a reverse osmosis principle, and discharges the treated water ③.

The water treatment control device 2 is basically a device for controlling the water treatment plant 1. In particular, chemicals are fed ⑤ in an early-stage process of the water treatment plant 1, and the water treatment control device 2 may control the chemical dosage. More specifically, in the early-stage process of the water treatment plant 1, chemicals, for example, an ion concentration (pH) control agent (e.g., H2SO4) and a coagulant (e.g., FeCl3) are fed. The water treatment control device 2 may control the dosing and the dosage of the chemicals.

The chemical dosing optimization apparatus 3 is for chemical dosing optimization. As described above, the water treatment control device 2 controls chemical dosing and the dosage for the water treatment plant 1. Herein, chemical dosing optimization is required so that the state of the treated water by water treatment is maintained in a normal range and a minimum of the chemical dosage is used in the feed water as necessary. However, the chemical dosage affects the differential pressure (DP) of the automatic strainer (AS), the UF device, and the RO device performing a late-stage process, so chemical dosing optimization is performed considering the differential pressure. The chemical dosing optimization apparatus 3 is for performing such chemical dosing optimization by controlling the water treatment control device 2 or giving guidance thereto. The chemical dosing optimization apparatus 3 may perform the chemical dosing optimization by providing guidance information to the water treatment control device 2.

Figure 2:
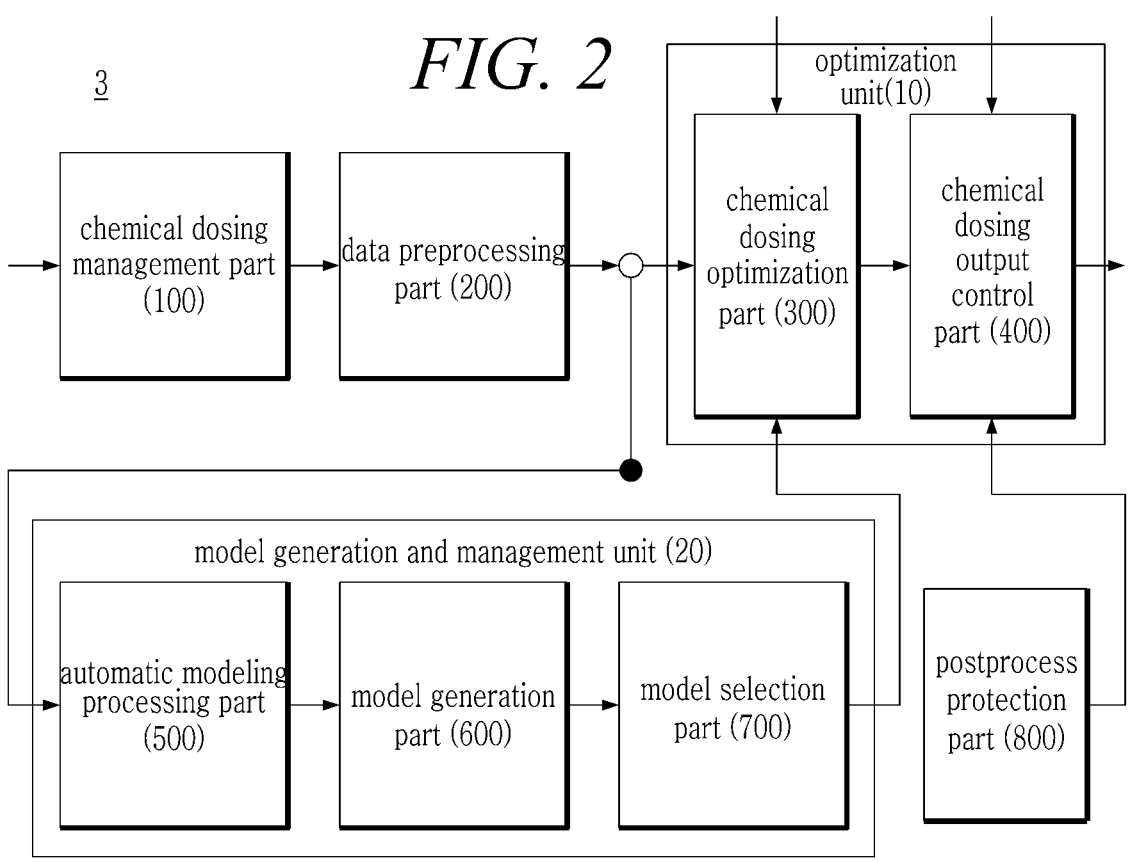
FIG. 2 is a block diagram illustrating a configuration of a chemical dosing optimization apparatus according to an embodiment of the present disclosure.

Next, a configuration of the chemical dosing optimization apparatus 3 according to an embodiment of the present disclosure will be described. FIG. 2 is a block diagram illustrating the configuration of the chemical dosing optimization apparatus according to an embodiment of the present disclosure. Referring to FIG. 2, the chemical dosing optimization apparatus 3 according to the embodiment of the present disclosure may include a chemical dosing management part 100 (performing DAF chemical dosing management), a data preprocessing part 200 (performing data preprocessing), an optimization unit 10 (performing chemical dosing optimization), a model generation and management unit 20 (performing DAF model generation and management), and a postprocess protection part 800 (performing postprocess protection logic). Furthermore, the optimization unit 10 may include a chemical dosing optimization part 300 (performing chemical dosing optimization algorithm) and a chemical dosing output control part 400 (which may be alternatively referred to as chemical dosing output controller). Furthermore, the model generation and management unit 20 may include an automatic modeling processing part 500 (which may be alternatively referred to as auto modeling processor for DAF model), a model generation part 600 (which may be alternatively referred to as DAF model candidate generator), and a model selection part 700 (which may be alternatively referred to as DAF model selection & management processor).

The chemical dosing management part 100 is for managing a chemical dosing optimization process. The chemical dosing management part 100 receives real-time data including operating data and state data from the water treatment plant 1 or the water treatment control device 2 or both, and analyzes the real-time data to determine whether to perform the chemical dosing optimization process. The real-time data means the operating data and the state data measured or derived in real time. In an embodiment of the present disclosure, the operating data may refer to and may include any one of all types of data including values, specifically, a set value (SV or target value (set point (SP))), a measured value (process variable (PV) or current value (CV)), and a manipulation value (manipulate variable (MV)), wherein the values are input to control processes or measured for the processes performed by the DAF device, the automatic strainer (AS), the UF device, and the RO device.

Herein, the set value (SV or SP) means a value for setting a control target of an object to be controlled. The measured value (PV or CV) means a sensed value obtained by measuring the object to be controlled. The manipulation value (MV) means a control value for manipulation so that the object to be controlled reaches the set value from the measured value. Examples of the set value and the measured value include flow rate, pressure, water level, temperature, etc. Examples of the manipulation value include an opening ratio, the RPM speed of a motor, voltage, current, etc. The operating data may be processed according to each objective and may be used for analysis.

In an embodiment of the present disclosure, data derived or processed for analyzing the operating data is referred to as the state data. Examples of the state data include values obtained by processing, through a logic derived through operating knowledge, data resulting from measuring a differential pressure of input and output stages of the UF device and the RO device.

The data preprocessing part 200 receives raw data. Herein, the raw data includes the operating data and the state data received from the water treatment plant 1 or the water treatment control device 2 or both. That is, the raw data results from accumulation and storage of the operating data and the state data collected from the water treatment plant 1 and the water treatment control device 2. Accordingly, the raw data may include the real-time data including the operating data and the state data collected in real time. In addition, the raw data may include a plurality of types of data having different attributes. The raw data may be continuously received over time from the water treatment plant 1 or the water treatment control device 2. In particular, the raw data received by the data preprocessing part 200 may include input attribute data having input attributes and output attribute data having output attributes. The input attributes and the output attributes may be input attributes and output attributes of the water treatment plant 1.

The input attribute data may include the operating data and the state data related to the feed water flowing into the water treatment plant 1, in particular, the DAF device. Examples of the input attribute data may include the flow rate of the feed water, temperature, conductivity, acidity (or hydrogen ion concentration), turbidity, the throughput for the feed water (per unit time), the chemical dosage for the feed water, the chemical dosing concentration, etc. The output attribute data may include the operating data and the state data related to the treated water subjected to water treatment by the DAF device. Examples of the output attribute data may include acidity (or hydrogen ion concentration, pH) or a variation in acidity of the treated water, turbidity or a variation in turbidity, residual iron, etc. in the treated water.

According to an embodiment, when the raw data is collected, the data preprocessing part 200 preprocesses the raw data to generate training data. The training data may include data for training and data for verification divided according to use. In addition, the training data may include input data and output data divided according to attributes. The training data is provided to the model generation and management unit 20. In addition, the data preprocessing part 200 may preprocess the real-time data and may provide the preprocessed real-time data to the optimization unit 10. The data preprocessing part 200 may use tags indicating data attributes to perform preprocessing by analyzing the raw data including the real-time data. This preprocessing is to perform signal processing, normal data processing (based on knowledge/data), and outlier removal to remove noise, or to remove noise in data, or to remove data that may adversely affect generating a DAF model or designing a controller.

The optimization unit 10 analyzes the real-time data to derive a control value for optimizing the chemical dosage. The optimization unit 10 includes the chemical dosing optimization part 300 and the chemical dosing output control part 400 as described above.

According to an embodiment, the chemical dosing optimization part 300 may analyze current data, and uses an analysis result of the current data to select an optimum controller from among a plurality of controllers previously created, and searches for an optimal chemical dosing control value. To search for the optimal chemical dosing control value, optimization design information may be used. The optimization design information may include an objective function, a constraint, a moderator variable, a searching range, etc. Herein, using at least one water treatment model, the chemical dosing optimization part 300 may analyze the real-time data to derive a prediction value for predicting the state (for example, turbidity, pH, etc.) of the treated water of the water treatment plant 1. In addition, using at least one controller, the chemical dosing optimization part 300 may derive a control value based on the prediction value, such that the control value is is to set a minimum of a chemical dosage to be dosed in the feed water, required for maintaining the state of the treated water of the water treatment plant 1 in the normal range. In other words, while the state of the treated water of the water treatment plant 1 is changed by an amount of chemical dosage used and the chemical dosage is changed by the control value, a control value may be derived by the chemical dosing optimization part 30 such that the control value is to set the lowest amount of the chemical dosage that makes the state of the treated water of the water plant 1 be in the normal range. The normal range of the treated water may be a predetermined value range of any indication of acidity (pH), turbidity, residual iron, dissolved oxygen, nitrogen, mercury, phosphorus, carbon dioxide, or hydrogen ion concentration of/in the treated water or any combination thereof.

The chemical dosing output control part 400 is basically for finally determining whether to provide or not provide the control value derived by the chemical dosing optimization part 300, according to a management command or a current state or both. The management command or the current state may be provided by the chemical dosing management part 100. The control value provided from the chemical dosing optimization part 300 to the chemical dosing output control part 400 is derived using the real-time data by the chemical dosing optimization part 300. However, there may be a case when the control value is data of the past the time, e.g., one minute or five minutes, ago than the present time point of processing by the chemical dosing output control part 40. In other words, there may be a case when it takes time for the chemical dosing optimization part 300 to search for the control value. Accordingly, according to an embodiment, the chemical dosing output control part 400 may compare the operating data and the state data that are the basis of calculation of the control value with the current operating data and the current state data. According to the comparison, when the differences are equal to or greater than reference values, the chemical dosing output control part 400 may corrects the control value, or hold or stop the output of the control value. The chemical dosing output control part 400 may provide the control value according to the management command of the chemical dosing management part 100 such that the water treatment control device 2 applies the control value automatically, or may provide the control value in the form of guidance such that the water treatment control device 2 determines whether to apply the control value.

In addition, according to an embodiment, the chemical dosing output control part 400 may correct the control value by using a correction bias value derived by the postprocess protection part 800 according to a postprocess protection logic. In particular, the chemical dosing output control part 400 may convert the control value according to a control period and a control range of the water treatment control device 2 such that the water treatment control device 2 operates stably, and the chemical dosing output control part 400 provides the control value resulting from conversion to the water treatment control device 2. According to an embodiment of the present disclosure, the chemical dosing output control part 400 may divide the control value into application control values with a range applicable to the water treatment control device 2. That is, the chemical dosing output control part 400 calculates the application control values by dividing the control value according to the control period and the control range of the water treatment control device 2 compared to a period of derivation of the control value by the chemical dosing optimization part 300. For example, assuming that the time period, that is, the period of derivation of the control value, for the chemical dosing optimization part 300 to search for an optimal control value is one minute and the control period of the water treatment control device 2 is 10 seconds and the control range is ±4, the control value of which the period of derivation is one minute is divided considering the control period, the 10-second interval, of the water treatment control device 2 and the control range of ±4, thereby calculating the application control values. Specifically, when the control value is for increasing by 20 from an existing value, values, 4(+4), 8(+4), 12(+4), 16(+4), 20(+4), and 20(+0)), increased by 4 every 10 seconds are provided as the application control values.

The model generation and management unit 20 is for automatically generating at least one water treatment model through training. The water treatment model is an algorithm including at least one artificial neural network, and simulates the water treatment plant 1 that generates treated water through water treatment (for example, DAF) of feed water. According to an embodiment, the water treatment model may receive various types of information indicative of the state of the feed water, and calculates a prediction value for predicting the state of the treated water by performing an operation on the state of the feed water as trained. Herein, examples of the state of the feed water may include the flow rate of the feed water, temperature, conductivity, acidity (or hydrogen ion concentration), turbidity, the throughput for the feed water (per unit time), the chemical dosage for the feed water, the chemical dosing concentration, etc. In addition, examples of the state of the treated water may include acidity or a variation in acidity of the treated water, turbidity or a variation in turbidity, residual iron, etc.

According to an embodiment, the model generation and management unit 20 may include the automatic modeling processing part 500, the model generation part 600, and the model selection part 700.

The automatic modeling processing part 500 may design a water treatment model to be newly generated and generates model design information. The automatic modeling processing part 500 designs a form, a structure, input and output, and a variable of the water treatment model. According to an embodiment, the automatic modeling processing part 500 may receive and determine model design information, such as a form, a structure, input and output, and a variable, of a water treatment model. According to another embodiment, the automatic modeling processing part 500 may extract model design information from any one of a plurality of pre-stored seed models, and may design a water treatment model according to the extracted model design information. The seed models are models generated by experts among water treatment models. The automatic modeling processing part 500 extracts model design information including at least one selected from the group of a form, a structure, input and output, and a variable of a seed model, and applies the model design information to a water treatment model to be newly generated. The extracted model design information is applied to the water treatment model to be newly generated.

According to an embodiment, the model generation part 600 may receive the model design information from the automatic modeling processing part 500, and generates a water treatment model based on the model design information through training with the training data. That is, the model generation part 600 generates a plurality of water treatment models through training with the training data including the data for training and the data for verification, wherein the water treatment models simulate the water treatment plant and predict the states of the treated water according to the states of the feed water for the water treatment plant. The training data includes the data for training and the data for verification and includes the input data and the output data corresponding to the input data. For example, examples of the input data may include the flow rate of the feed water, temperature, conductivity, acidity (or hydrogen ion concentration), turbidity, the throughput for the feed water (per unit time), the injection dosing concentration for the feed water, etc. In addition, examples of the output data may include acidity or a variation in acidity of the treated water, turbidity or a variation in turbidity, etc. Herein, in training, the output data may be used as a target value corresponding to the input data.

According to an embodiment, the model selection part 700 may select the optimal water treatment model by comparing a water treatment model generated by the model generation part 600 with pre-stored water treatment models for evaluation. To this end, evaluation data indicative of the water treatment plant 1 at the time point of evaluation may be used to evaluate the plurality of water treatment models. Similarly to the training data and the verification data, the evaluation data may include input data and output data corresponding to the input data. That is, the model selection part 700 generates the evaluation data based on data collected from the water treatment plant 1 at the time point of evaluation, and performs evaluation with the generated evaluation data. That is, the model selection part 700 may use the evaluation data collected from the water treatment plant at the time point of evaluation to evaluate the plurality of water treatment models. As an evaluation result, the model selection part 700 may select, among the plurality of water treatment models, the water treatment model having the highest similarity to the water treatment plant 1 at the time point of evaluation. Next, the model selection part 700 may provide the selected water treatment model to the chemical dosing optimization part 300. In addition, each time evaluation ends, the model selection part 700 may arrange the water treatment models in order of generation. When the storage capacity of a storage space in which the water treatment models are stored is insufficient, the model selection part 700 may delete, among the unselected water treatment models, the water treatment models sequentially in chronological order of generation.

According to an embodiment, the postprocess protection part 800 may receive postprocess data including the operating data and the state data of the late-stage process, specifically, the process performed by the automatic strainer (AS), the UF device, and the RO device, of the water treatment plant 1 and may analyze the received postprocess data to derive a correction bias value for protecting the postprocess according to a postprocess protection logic for preventing damage to the late-stage process, for example, a situation in which fouling occurs. Herein, fouling means a phenomenon in which contaminants in the feed water clog a membrane. The correction bias value may be provided to the chemical dosing output control part 400.

Figure 3:
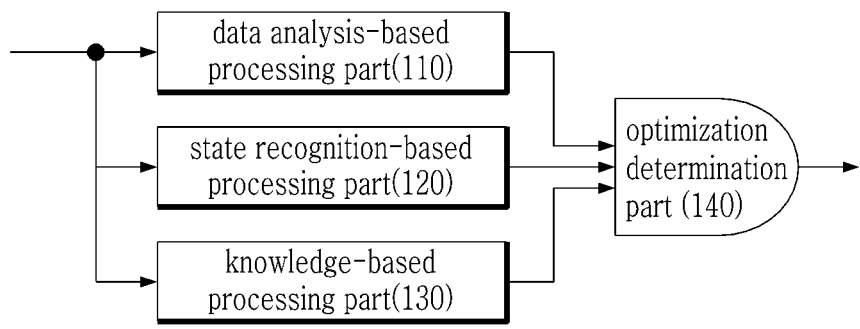
FIG. 3 is a diagram illustrating a configuration of a chemical dosing management part for chemical dosing optimization according to an embodiment of the present disclosure.

Next, a configuration of the chemical dosing management part 100 for chemical dosing optimization according to an embodiment of the present disclosure will be described. FIG. 3 is a diagram illustrating the configuration of the chemical dosing management part for chemical dosing optimization according to an embodiment of the present disclosure.

Referring to FIG. 3, the chemical dosing management part 100 according to an embodiment of the present disclosure may include a data analysis-based processing part 110, a state recognition-based processing part 120, a knowledge-based processing part 130, and an optimization determination part 140.

The chemical dosing management part 100 may receive the real-time data including the operating data and the state data, and determines whether to perform the chemical dosing optimization process for optimizing the chemical dosage injected in the early-stage process of the water treatment plant 1, and determines the performance aspect of the chemical dosing optimization process. Herein, optimization is to ensure an optimized state that is a state in which the chemical dosage is minimized while the state of the treated water of the water treatment plant 1 is maintained in the normal range. To this end, the real-time data is input to the data analysis-based processing part 110, the state recognition-based processing part 120, and the knowledge-based processing part 130. Each of the data analysis-based processing part 110, the state recognition-based processing part 120, and the knowledge-based processing part 130 determines a condition for determining whether to perform the chemical dosing optimization process. In addition, the optimization determination part 140 combines the conditions to determine whether to perform the chemical dosing optimization process and determine the performance aspect thereof. A detailed description of this is as follows.

The data analysis-based processing part 110 may analyze the operating data of the water treatment plant 1 through a learning model to determine whether the water treatment plant is in the optimized state, thereby determining a first condition for determining the start of the chemical dosing optimization process. Herein, the learning model may be a pattern recognition model or a machine learning model that determines whether the water treatment plant is in the optimized state or not. Accordingly, the learning model analyzes the operating data to determine whether the water treatment plant is in the optimized state. When the water treatment plant is not in the optimized state, it is determined that the first condition is satisfied.

The state recognition-based processing part 120 may analyze the state data of the water treatment plant 1 to detect an abnormal state of the water treatment plant, thereby determining a second condition for determining whether to perform the chemical dosing optimization process. Herein, examples of the abnormal state include an inflow of algae, an overflow inflow of throughput or more into the water treatment plant, a system abnormality in the water treatment plant 1, a sensor abnormality, etc. The state recognition-based processing part 120 analyzes the state data, and determines that the second condition is satisfied when the abnormal state is detected. According to an embodiment, by analyzing the state data of the water treatment plant 1, the water treatment plant 1 may be detected as being in an abnormal state if any indication of acidity (pH), turbidity, residual iron, dissolved oxygen, nitrogen, mercury, phosphorus, carbon dioxide, or hydrogen ion concentration of/in the treated water or any combination thereof is not within a predetermined value range.

The knowledge-based processing part 130 may use pre-stored knowledge-based data to analyze the operating data and the state data of the real-time data of the late-stage process, specifically, the process performed by the automatic strainer (AS), the UF device, and the RO device, of the water treatment plant 1 and to detect whether the operating data and the state data correspond to the pre-stored knowledge-based data, thereby determining a third condition for determining whether to perform the chemical dosing optimization process. That is, the knowledge-based data resulting from storing data representing a situation in which the chemical dosing optimization process is required according to existing empirical rules, and the knowledge-based processing part 130 determines that the third condition is satisfied when the operating data and the state data correspond to the knowledge-based data.

Depending on whether the first, the second, and the third condition are satisfied, the optimization determination part 140 may determine whether to perform the chemical dosing optimization process and determines the performance aspect thereof. That is, when all the first condition, the second condition, and the third condition are satisfied, the optimization determination part 140 performs control such that the optimization unit 10 derives a control value for entering the optimized state by performing the chemical dosing optimization process and provides the derived control value to the water treatment control device. According to an embodiment, when the first condition is satisfied and the second condition or the third condition or both are not satisfied, the optimization determination part 140 performs control such that the optimization unit 10 provides the control value in the form of guidance. In this case, performing the chemical dosing optimization process has the possibility of worsening the state of the water treatment plant 1 or the water treatment control device 2, so the control value is provided in the form of guidance and the chemical dosing optimization process is not forced. The control value provided in the form of guidance is provided or displayed through an operating screen so that an operator of the plant can read the control value. According to another embodiment, when the first condition is not satisfied, the optimization determination part 140 performs control such that the chemical dosing optimization process is not performed even when the second condition and the third condition are satisfied. In this case, performing the chemical dosing optimization process may worsen the state of the water treatment plant 1 or the water treatment control device 2 further, so the chemical dosing optimization process is not performed.

Figure 4:
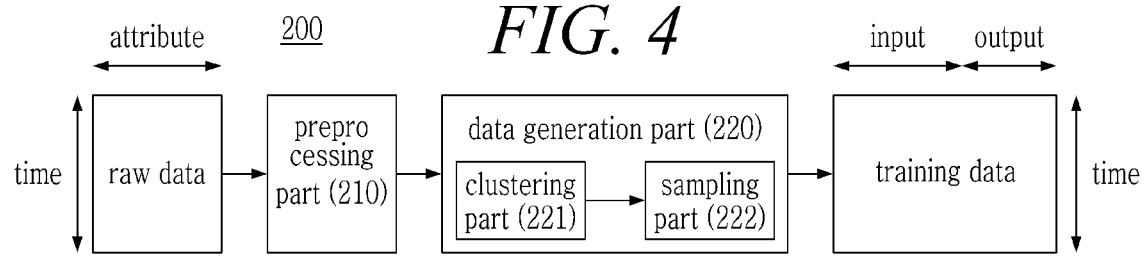
FIG. 4 is a diagram illustrating a configuration of a data preprocessing part for chemical dosing optimization according to an embodiment of the present disclosure.

Next, a configuration of the data preprocessing part 200 for chemical dosing optimization according to an embodiment of the present disclosure will be described. FIG. 4 is a diagram illustrating the configuration of the data preprocessing part for chemical dosing optimization according to an embodiment of the present disclosure.

Referring to FIG. 4, the data preprocessing part 200 may include a preprocessing part 210 and a data generation part 220. The data generation part 220 may further include a clustering part 211 and a sampling part 222.

According to an embodiment, the preprocessing part 210 receives raw data and performs preprocessing. The raw data may be continuously received over time from the water treatment plant 1 and/or the water treatment control device 2. The raw data may include a plurality of types of data having different attributes. In particular, the raw data includes input attribute data having input attributes and output attribute data having output attributes. The input attribute data may include the operating data and the state data related to the feed water flowing into the water treatment plant 1, in particular, the DAF device. Examples of the input attribute data may include the flow rate of the feed water, temperature, conductivity, acidity (or hydrogen ion concentration), turbidity, the throughput for the feed water (per unit time), the chemical dosage for the feed water, the chemical dosing concentration, etc. The output attribute data includes the operating data and the state data related to the treated water subjected to water treatment by the DAF device. Examples of the output attribute data may include acidity (or hydrogen ion concentration, pH) or a variation in acidity of the treated water, turbidity or a variation in turbidity, residual iron, etc.

According to an embodiment, preprocessing part 210 may restore a missing value of the raw data. Herein, the preprocessing part 210 may restore a missing value by replacing the missing value with any one of the following: the average, the median, and the mode of a plurality of pieces of the raw data temporally near the raw data having the missing value input.

In addition, the preprocessing part 210 may calculate an average of time-continuous pieces of the raw data at every predetermined period and may perform merging into one piece of the raw data having the calculated average. For example, when the predetermined period is one minute, merging is performed into one piece of the raw data having the average for one minute of the raw data input. This period may coincide with a control period of the chemical dosing optimization apparatus 3.

According to an embodiment, the preprocessing part 210 may align, in synchronization, the input attribute data having the input attributes and the output attribute data having the output attributes and corresponding to the input attribute data among the raw data. As described above, the input attribute data refers to the data related to the feed water flowing into the DAF device, and the output attribute data refers to the data related to the treated water discharged after water treatment by the DAF device. Since the feed water passes through a treatment tank and pipes of the DAF device and is discharged as the treated water, there is a difference as much as hydraulic retention time (HRT) for the treated water that shows effects of chemical dosing into the feed water. Accordingly, in the present disclosure, the input attribute data and the output attribute data may be aligned in synchronization considering the hydraulic retention time (HRT). That is, the preprocessing part 210 may calculate the hydraulic retention time (HRT) caused by the DAF device considering the flow rate of the feed water flowing into the DAF device, the size of the treatment tank of the DAF device, and the lengths and diameters of the pipes, and aligns the input attribute data and the output attribute data in synchronization according to the calculated hydraulic retention time (HRT).

In addition, the preprocessing part 210 may erase the raw data of a time interval in which water quality abnormality has occurred. The preprocessing part 210 may receive water quality information through a water quality abnormality monitoring system (ADS, not shown) with respect to the time interval in which the water quality is abnormal, and may analyze the water quality information to determine whether the water quality is abnormal. The water quality information may be indicative of, for example, dissolved oxygen, nitrogen, mercury, phosphorus, turbidity, carbon dioxide, hydrogen concentration, etc. The water quality may be determined to be abnormal if any one of indicatives of, for example, dissolved oxygen, nitrogen, mercury, phosphorus, turbidity, carbon dioxide, hydrogen concentration, etc. is not within a predetermined value range. In addition, the time interval in which the water quality is abnormal may be determined by a water quality manager that examines water quality in person and inputs the period of time during which the water quality abnormality has occurred according to a result of examination. That is, the preprocessing part 210 may receive the manager's input and recognize the period of time during which the water quality abnormality has occurred.

According to an embodiment, the preprocessing part 210 may erase outliers out of a preset minimum-maximum range (MAX, MIN) from the raw data. That is, the preprocessing part 210 may erase the outliers out of the range between a preset minimum value (MIN) and a preset maximum value (MAX) from the raw data to extract only normal values in the range between the minimum value (MIN) and the maximum value (MAX).

According to an embodiment, the preprocessing part 210 may remove noise of the raw data having water quality attributes among the raw data through filtering using a band filter. Examples of the band filter may include a low-pass filter, a band-pass filter, a notch filter, etc.

According to an embodiment, the preprocessing part 210 may use the raw data of one or at least two attributes to generate the raw data of a new attribute. Herein, the unit of a value of the raw data may be converted according to a change of an attribute. For example, the turbidity of the feed water and the turbidity of the treated water among the raw data may be used to generate the raw data having an attribute of the rate of change in turbidity representing a difference between the turbidity of the feed water and the turbidity of the treated water. As another example, conversion into the flow rate of the treated water into which the chemicals are dosed may be based on the chemical concentration among the raw data. The unit of the flow rate of the treated water may be converted into the throughput per hour (L/h) based on the concentration (ppm).

As described above, the data generation part 220 may further include the clustering part 211 and the sampling part 222.

The clustering part 221 clusters the raw data according to a correlation between the attributes of the raw data. For example, normal data having the attribute correlation of a predetermined value or more may be grouped. According to an additional embodiment, the raw data having a pattern with the similarity of a predetermined value or more may be grouped. In particular, the raw data includes input attribute data having input attributes and output attribute data having output attributes. The input attribute data includes the operating data and the state data related to the feed water flowing into the water treatment plant 1, in particular, the DAF device. Examples of the input attribute data may include the flow rate of the feed water, temperature, conductivity, acidity (or hydrogen ion concentration), turbidity, the throughput for the feed water (per unit time), the chemical dosage for the feed water, the chemical dosing concentration, etc. The output attribute data includes the operating data and the state data related to the treated water subjected to water treatment by the DAF device. Examples of the output attribute data may include acidity (or hydrogen ion concentration, pH) or a variation in acidity of the treated water, turbidity or a variation in turbidity, residual iron, etc. The clustering part 221 may cluster the raw data according to the correlation between the attributes of the raw data, and may cluster the input attribute data and the output attribute data having the correlation of a predetermined value or more with the input attribute data. Clustering is performed according to the correlation between the attributes, and the training data is generated and is used in performing training in a subsequent procedure, so that when a water treatment model is generated, the performance thereof may be improved.

The sampling part 222 may generate the training data by sampling the raw data according to the attributes of the clustered raw data. The clustered raw data includes the input attribute data and the output attribute data. A water treatment model simulates the water treatment plant and predicts the state of the treated water discharged through water treatment by the water treatment plant 1 according to the state of the feed water and the chemicals dosed into the feed water. Accordingly, the input data used as the training data of the water treatment model may be the input attribute data having attributes, that is, the above-described input attributes, related to the feed water and the chemicals. The output data may be the output attribute data having attributes, that is, the output attributes, related to the state of the treated water. Accordingly, according to an embodiment, the sampling part 222 may extract the input data input to the water treatment model, may extract the output data output when the input data is input to the water treatment model, and may map the extracted input data and the extracted output data to generate the training data. In other words, the sampling part 222 may sample the input attribute data to extract the sampled input attribute data as the input data, and may sample the output attribute data to extract the sampled output attribute data as the output data.

Figure 5:
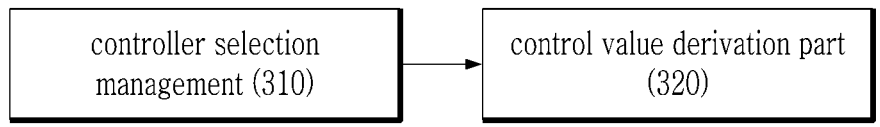
FIG. 5 is a diagram illustrating a configuration of a chemical dosing optimization part according to an embodiment of the present disclosure.

Next, a configuration of the chemical dosing optimization part 300 for chemical dosing optimization according to an embodiment of the present disclosure will be described. FIG. 5 is a diagram illustrating the configuration of the chemical dosing optimization part according to an embodiment of the present disclosure.

Referring to FIG. 5, the chemical dosing optimization part 300 may include a controller selection management part 310 and a control value derivation part 320.

The controller selection management part 310 may use data to evaluate performances of a plurality of controllers through simulation, and selects a controller from among the plurality of controllers to be used for chemical dosing optimization according to an evaluation result. In this performance evaluation, according to an embodiment, the previously selected water treatment model may be used. Each controller is an optimization algorithm model, and examples of the controller may include at least one of particle swarm optimization (PSO), an autoregressive eXogeneous (ARX) model, the Ziegler-Nichols (ZN) method, etc. The controller selection management part 310 selects, among the plurality of controllers described above, a controller that derives a minimum of a chemical dosage while the state of the treated water of the water treatment plant 1 is maintained in the normal range. In other words, a controller is selected from among the plurality of controllers such that the controller derives the lowest amount of the chemical dosage maintaining the state of the treated water of the water treatment plant 1 in the normal range. The selected controller is provided to the chemical dosing optimization part 300.

The control value derivation part 320 may analyze the real-time data using the water treatment model and the controller and calculates a control value for chemical dosing optimization. Herein, the real-time data may include the operating data and the state data received from the water treatment plant 1 or the water treatment control device 2 or both. In particular, the real-time data may include the state of the feed water, the state of the treated water, and performance information of the water treatment plant 1. Herein, examples of the state of the feed water may include the flow rate of the feed water, temperature, conductivity, acidity (or hydrogen ion concentration), turbidity, the throughput for the feed water (per unit time), the injection dosing concentration for the feed water, etc. In addition, examples of the state of the treated water may include acidity or a variation in acidity of the treated water, turbidity or a variation in turbidity, etc. The control value derivation part 320 analyzes the real-time data using the water treatment model and the controller and calculates the control value for dosing a minimum of a chemical dosage while the state of the treated water of the water treatment plant 1 is maintained in the normal range. According to an embodiment, the control value may be calculated for each control period (for example, one minute) of the chemical dosing optimization apparatus 3. According to another embodiment, the control value may be sequentially calculated on a per-group basis, a per-part basis, and a per-unit basis.

Herein, the water treatment model receives the data indicative of the state of the feed water and a chemical dosage derived by the controller, and calculates a prediction value for predicting the state of the treated water. In addition, the controller receives the prediction value predicted by the water treatment model, and calculates a chemical dosage considering the constraint limiting the range of the state of the treated water and the objective function for minimizing chemical dosing costs according to the prediction value. In this way, until a termination condition is satisfied, repeated is such an interaction in which the water treatment model calculates a prediction value by receiving a chemical dosage calculated by the controller and the controller calculates a chemical dosage by receiving a prediction value calculated by the water treatment model. According to an embodiment, the termination condition may be a number of the repetition of such interaction, or a time period during which the repetition is performed, or the difference between a boundary value of the normal range and a resulted value based on the calculation by the water treatment model and/or the controller. As a result, derived is a control value for dosing a minimum of a chemical dosage while the state of the treated water is maintained in the normal range.

Figure 6:
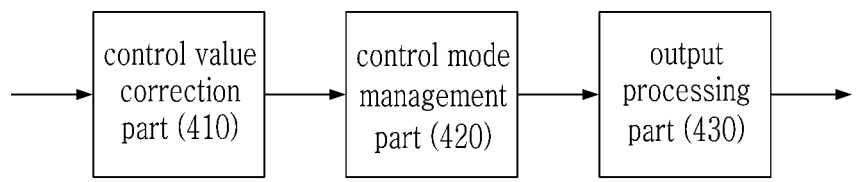
FIG. 6 is a diagram illustrating a configuration of a chemical dosing output control part for chemical dosing optimization according to an embodiment of the present disclosure.

Next, a configuration of the chemical dosing output control part 400 for chemical dosing optimization according to an embodiment of the present disclosure will be described. FIG. 6 is a diagram illustrating the configuration of the chemical dosing output control part for chemical dosing optimization according to an embodiment of the present disclosure.

Referring to FIG. 6, the chemical dosing output control part 400 may include a control value correction part 410, a control mode management part 420, and an output processing part 430.

According to an embodiment, the control value correction part 410 may use a correction bias value received from the postprocess protection part 800 to correct a control value received from the chemical dosing optimization part 300 according to a predetermined control period (e.g., one minute).

Through at least one water treatment model, the chemical dosing optimization part 300 analyzes the real-time data received for a control period (e.g., one minute) to derive a prediction value for predicting the state (specifically, the state in ③ of FIG. 1) of the treated water of the water treatment plant 1. Through a controller, the chemical dosing optimization part 300 derives a control value based on the prediction value, wherein the control value is for dosing a minimum of a chemical dosage while the state of the treated water of the water treatment plant is maintained in the normal range. The chemical dosing optimization part 300 provides the derived control value to the chemical dosing output control part 400. In addition, the postprocess protection part 800 analyzes the postprocess data including the operating data and the state data of a process resulting from the late-stage process received for a control period (e.g., one minute) to derive a correction bias value for preventing damage to the late-stage process (specifically, damage occurring between ③ and ④ of FIG. 1), and provides the derived correction bias value to the chemical dosing output control part 400. Accordingly, the control value correction part 410 may use the correction bias value received from the postprocess protection part 800 to correct the control value. For example, when control values are target values of dosages of sulfuric acid and iron chloride, the control values may be corrected as in Equation 1 below.

Sulfuric Acid Target=Sulfuric Acid Target+AFCS×
    Sulfuric Acid Bias

Ferric Chloride Target=Ferric Chloride Target+
    AFCS×Ferric Chloride Bias    <Equation 1>

Herein, Sulfuric Acid Target and Ferric Chloride Target are target values of dosages of sulfuric acid and iron chloride, the anti-fouling controller switch (AFCS) is 0 or 1, and Sulfuric Acid Bias and Ferric Chloride Bias are correction bias values of the dosages of sulfuric acid and iron chloride.

According to an embodiment, the control mode management part 420 is for resetting a control mode. The control mode may be one from among an auto mode, a guide mode, a hold mode, and a stop mode. The auto mode means that the output processing part 430 provides a control value to the water treatment control device 2 and the control value is automatically applied to the water treatment control device 2. In the auto mode, the water treatment control device 2 applies the control value automatically to control the water treatment plant 1. The guide mode is a mode in which the output processing part 430 provides a control value to the water treatment control device 2, but the control value is provided in a readable state so that the water treatment control device 2 determines whether to apply the control value. The hold mode is a mode in which the output processing part 430 converts a control value according to a control period of the water treatment control device and a control range in each control period, but the control value resulting from conversion is not provided to the water treatment control device. In the stop mode, the control mode management part 420 does not provide the control value to the output processing part 430. Accordingly, the output processing part 430 cannot provide the control value to the water treatment control device 2 in the stop mode.

As described above with reference to FIG. 3, the chemical dosing management part 100 analyzes the real-time data to determine the control mode of chemical dosing optimization, and provides the determined control mode as the management command. Then, according to an embodiment, the control mode management part 420 may reset the control mode considering the control mode of the previous control period according to a predetermined control period (e.g., one minute) and determining whether the control value is normally updated for each period according to the predetermined control period (e.g., one minute). According to an embodiment, the input of the control value needs to be updated for each control period (continual input is required despite the same value). However, according to another embodiment, when the control period in which the control value is not input continues for a predetermined period or longer, it may be determined that an abnormal situation has occurred and the control mode may be switched to the hold mode or the stop mode considering the control mode of the previous control period.

In addition, the control mode management part 420 may compare the real-time data of the previous control period with that of the current control period according to a predetermined control period, and when there is a difference equal to or greater than a preset threshold, the control mode management part 420 may reset the control mode to the hold mode. The control value calculated by the chemical dosing optimization part 300 is derived using the real-time data of the previous control period according to a control period. However, when there is a difference beyond a predetermined reference value between the real-time data of the current control period and the real-time data of the previous control period, it may be determined that the control value has no reliability and the control mode is switched to the hold mode.

The output processing part 430 may provide the control value to the water treatment control device 2 according to the control by the control mode management part 420, that is, the control mode may be reset by the control mode management part 420. In particular, when the output processing part 430 receives the control value for each control period from the control mode management part 420, the output processing part 430 converts the control value according to the control period of the water treatment control device 2 and the control range of the water treatment control device 2 in each control period, and may provide the control value resulting from conversion to the water treatment control device 2. If it is assumed, for example, that the control period of the chemical dosing optimization apparatus 3 is one minute and the control period of the water treatment control device 2 is 10 seconds and that the control range in each control period of the water treatment control device 2 is ±4, then, the chemical dosing optimization part 300 calculates the control value at intervals of one minute, and the control value correction part 410 of the chemical dosing output control part 400 corrects the control value at intervals of one minute, and the control mode management part 420 provides the control value to the output processing part 430 at intervals of one minute. Herein, the provided control value is the target value, and it is assumed that the target value is +20. Then, the output processing part 430 changes the control value and provides the water treatment control device 2 with the control values of +4, +8, +12, +16, +20, and +20 at intervals of 10 seconds according to the control period and the control range of the water treatment control device 2.

Figure 7:
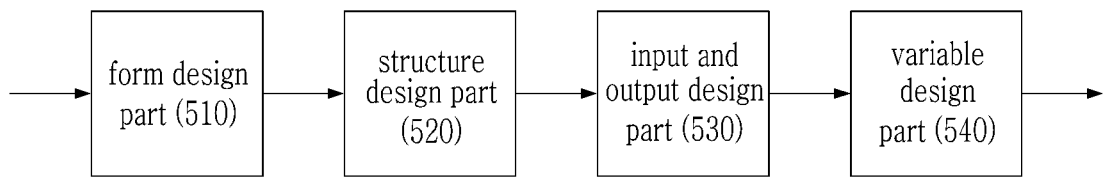
FIG. 7 is a diagram illustrating a configuration of an automatic modeling processing part for chemical dosing optimization according to an embodiment of the present disclosure.

Next, a configuration of the automatic modeling processing part 500 for chemical dosing optimization according to an embodiment of the present disclosure will be described. FIG. 7 is a diagram illustrating the configuration of the automatic modeling processing part for chemical dosing optimization according to an embodiment of the present disclosure.

Referring to FIG. 7, the automatic modeling processing part 500 is for generating design information that includes a model form, a model structure, input and output of a model, and a variable of a model, and is for providing the generated design information to the model generation part 600. According to an embodiment, the automatic modeling processing part 500 may include a form design part 510, a structure design part 520, an input and output design part 530, and a variable design part 540.

The form design part 510 may set the model form of a water treatment model. Examples of the model form may include autoregressive exogenous (ARX), finite impulse response (FIR), neural network (NN), state space (SS), etc. According to an embodiment, when a controller for deriving an optimal chemical dosage is determined, the form design part 510 may set a model form suitable for the form of the determined controller. According to another embodiment, the form design part 510 may adopt the model form of any one of the plurality of pre-stored seed models as the model form of a water treatment model. Herein, the seed models are models generated by experts among water treatment models. According to another embodiment, the model form may be adopted according to a user input.

The structure design part 520 may select a model structure. The model structure refers to the number of submodels per output of a water treatment model. For example, a structure having one model with one input and one output may be set, or a structure in which one input is input to a first submodel and an output of the first submodel is input to a second submodel and an output of the second submodel is a final output may be set. According to an embodiment, the structure design part 520 may adopt the model structure of any one of the plurality of pre-stored seed models as the model structure of a water treatment model. According to another embodiment, the structure design part 520 may adopt a model structure according to a user input.

The input and output design part 530 may set input and output of a water treatment model. For example, examples of the input may include the flow rate of the feed water, temperature, conductivity, acidity (or hydrogen ion concentration), turbidity, the throughput for the feed water (per unit time), the injection dosing concentration for the feed water, etc. In addition, examples of the output may include acidity or a variation in acidity of the treated water, turbidity or a variation in turbidity, residual iron or a variation in residual iron, etc. According to an embodiment, the input and output design part 530 may adopt input and output applied to any one of the plurality of pre-stored seed models as input and output of a water treatment model similarly. According to another embodiment, the structure design part 520 may set input and output of a water treatment model according to a user input.

The variable design part 540 may set a variable of a water treatment model. The variable may be a variable that determines linearity, exponent, and delay time. According to an embodiment, the input and output design part 530 may adopt a variable applied to any one of the plurality of pre-stored seed models as a variable of a water treatment model. According to another embodiment, the structure design part 520 may set a variable of a water treatment model according to a user input.

Figure 8:
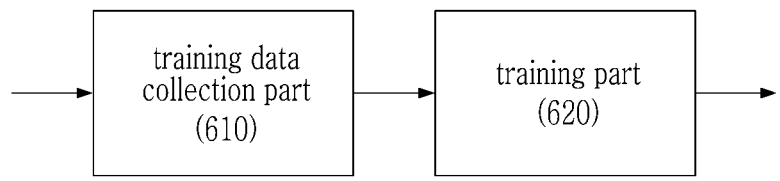
FIG. 8 is a diagram illustrating a configuration of a model generation part for chemical dosing optimization according to an embodiment of the present disclosure.

Next, a configuration of the model generation part 600 for chemical dosing optimization according to an embodiment of the present disclosure will be described. FIG. 8 is a diagram illustrating the configuration of the model generation part for chemical dosing optimization according to an embodiment of the present disclosure.

Referring to FIG. 8, the model generation part 600 is for training a water treatment model according to an embodiment of the present disclosure. The model generation part 600 may include a training data collection part 610 and a training part 620.

According to an embodiment, the training data collection part 610 may continuously receive the training data generated by the data preprocessing part 200 through preprocessing, and continuously stores the received training data. The training data may include the data for training and the data for verification. The data for training is for training a water treatment model, and the data for verification is for verifying whether the water treatment model has reached a target performance. In an embodiment of the present disclosure, the data for training and the data for verification are divided according to a time point of generating or training for generating a water treatment model and a time point of storing the training data. When training for generating a water treatment model starts, the training data collection part 610 extracts, as the data for verification, the training data stored from a first time point to the present among the stored training data according to time when the training data is stored, wherein the first time point is before the present (i.e., the time point of performing training). In addition, the training data collection part 610 extracts, as the data for training, the training data stored from a second time point to the first time point among the stored training data, wherein the second time point is before the first time point. The training data including the extracted data for training and the extracted data for verification is provided to the training part 620.

According to an embodiment, the training part 620 generates a water treatment model through training when a preset model generation condition is satisfied. Herein, the model generation condition may include a case in which a preset model generation period arrives. The preset model generation period may be determined according to resources available for the operation (for example, CPU resources) of the training part 620. That is, the shorter the preset model generation period is, the larger the capacity of resources is available for the operation of the training part 620. The longer the preset model generation period is, the smaller the capacity of operation-available resources of the training part 620 is. In addition, the model generation condition may include a case in which a preset event has occurred. Herein, examples of the preset event may include restart of a power station due to full repair or overhaul, a change in a database, a change in the characteristics of the water treatment plant, etc.

According to an embodiment, when the model generation condition is satisfied, the training part 620 may receive the training data from the training data collection part 610, and use the received training data to generate a water treatment model that simulates the water treatment plant 1 and may predict the state of the treated water according to the state of the feed water for the water treatment plant. The training part 620 may input the input data (IN) of the training data to the water treatment model, and when the water treatment model calculates a prediction value through operation, the training part 620 calculates a loss that is a difference from the output data used as a target value through a loss function, and performs optimization in which parameters of the water treatment model are updated through, for example, a backpropagation algorithm so that the calculated loss is minimized. Through repetition of this optimization, a water treatment model may be generated.

Figure 9:
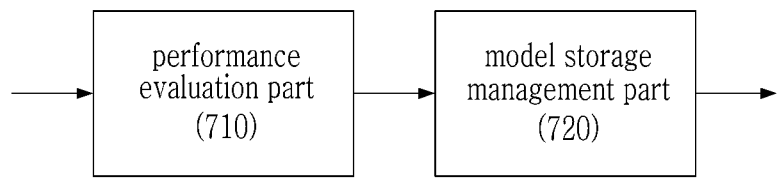
FIG. 9 is a diagram illustrating a configuration of a model selection part for chemical dosing optimization according to an embodiment of the present disclosure.

Next, a configuration of the model selection part 700 for chemical dosing optimization according to an embodiment of the present disclosure will be described. FIG. 9 is a diagram illustrating the configuration of the model selection part for chemical dosing optimization according to an embodiment of the present disclosure.

Referring to FIG. 9, the model selection part 700 may evaluate performances of water treatment models generated by the model generation part 600, may store a suitable water treatment model according to evaluation, and provide the water treatment model to the chemical dosing optimization part 300. The model selection part 700 may include a performance evaluation part 710 and a model storage management part 720.

According to an embodiment, the performance evaluation part 710 is for evaluating the performance of a water treatment model generated by the model generation part 600. The performance evaluation part 710 collects the evaluation data, and uses the collected evaluation data to evaluate the performance of a water treatment model. The evaluation data may include input data and output data corresponding to the input data. The performance evaluation part 710 may use the evaluation data collected from the water treatment plant to select a water treatment model having the highest similarity to the water treatment plant among generated water treatment models.

When the optimal water treatment model is selected as an evaluation result of the performance evaluation part 710, the model storage management part 720 may store the selected water treatment model in a predetermined storage space. The model storage management part 720 may arrange the water treatment models in order of generation. When the storage capacity of the storage space in which the water treatment models are stored is insufficient, the model storage management part 720 may delete, among the unselected water treatment models, the water treatment models sequentially in chronological order of generation.

Figure 10:
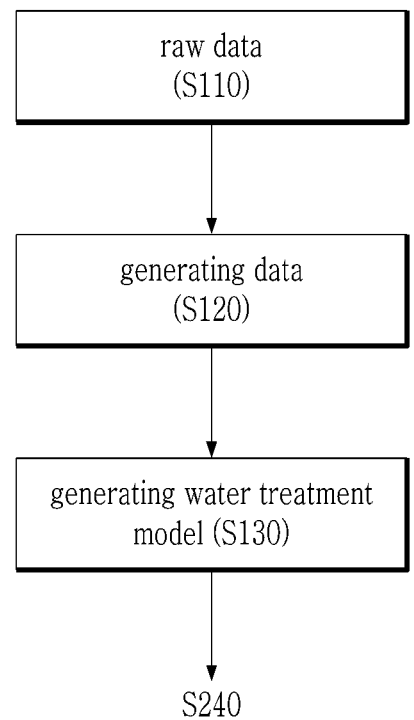
FIG. 10 is a flowchart illustrating a chemical dosing optimization method for a water treatment plant according to an embodiment of the present disclosure.

Next, a chemical dosing optimization method for a water treatment plant according to an embodiment of the present disclosure will be described. FIG. 10 is a flowchart illustrating the chemical dosing optimization method for a water treatment plant according to an embodiment of the present disclosure.

Referring to FIG. 10, a data preprocessing part 200 receives raw data in step S110. The raw data includes operating data and state data received from a water treatment plant 1 or a water treatment control device 2 or both. That is, the raw data results from accumulation and storage the operating data and the state data collected over time from the water treatment plant 1 and the water treatment control device 2. Accordingly, the raw data may include real-time data including the operating data and the state data collected in real time. In particular, the raw data may include a plurality of types of data having different attributes. The raw data may be continuously received over time from the water treatment plant 1 or the water treatment control device 2. In particular, the raw data may include input attribute data having input attributes and output attribute data having output attributes. The input attribute data may include the operating data and the state data related to the feed water flowing into the water treatment plant 1, in particular, the DAF device. Examples of the input attribute data may include the flow rate of the feed water, temperature, conductivity, acidity (or hydrogen ion concentration), turbidity, the throughput for the feed water (per unit time), the chemical dosage for the feed water, the chemical dosing concentration, etc. The output attribute data may include the operating data and the state data related to the treated water subjected to water treatment by the DAF device. Examples of the output attribute data may include acidity (or hydrogen ion concentration, pH) or a variation in acidity of the treated water, turbidity or a variation in turbidity, residual iron, etc.

When the raw data is collected, the data preprocessing part 200 preprocesses the raw data to generate training data in step S120. The training data may include data for training and data for verification divided according to use. In addition, the training data includes input data and output data divided according to attribute. The input data may be derived by preprocessing the input attribute data, and the output data may be derived by preprocessing the output attribute data. Examples of the input data may include the flow rate of the feed water, temperature, conductivity, acidity (or hydrogen ion concentration), turbidity, the throughput for the feed water (per unit time), the chemical dosage for the feed water, the chemical dosing concentration, etc. Examples of the output data may include acidity (or hydrogen ion concentration, pH) or a variation in acidity of the treated water, turbidity or a variation in turbidity, residual iron, etc. In particular, in preprocessing, the data preprocessing part 200 may cluster the raw data according to the correlation between the attributes of the raw data, and generates the training data by clustering the input attribute data and the output attribute data having the correlation of a predetermined value or more with the input attribute data. The training data may include the data for training and the data for verification divided according to use. In addition, the training data may include the input data and the output data divided according to attribute. The training data may be generated according to the correlation between the attributes and be used in performing training in a subsequent procedure, so that when a water treatment model is generated, the performance thereof may be improved.

Next, a model generation and management unit 20 including an automatic modeling processing part 500, a model generation part 600, and a model selection part 700 receives the training data, and uses the training data to generate a water treatment model in step S130. In step S130, the automatic modeling processing part 500 may design the water treatment model. The designing of the water treatment model means specifying the form of the model, the number of submodels belonging to one model, input, output, and a variable. Then, the model generation part 600 may use the data for training of the training data to perform training on the designed water treatment model, thereby generating a water treatment model that simulates the water treatment plant 1 and predicts the state of the treated water according to the state of the feed water for the water treatment plant 1. Next, the model selection part 700 may use the data for verification of the training data to select, among a plurality of the water treatment models, the water treatment model having the highest similarity to the water treatment plant 1. In this way, the selected water treatment model is provided to a chemical dosing optimization part 300 of an optimization unit 10.

Figure 11:
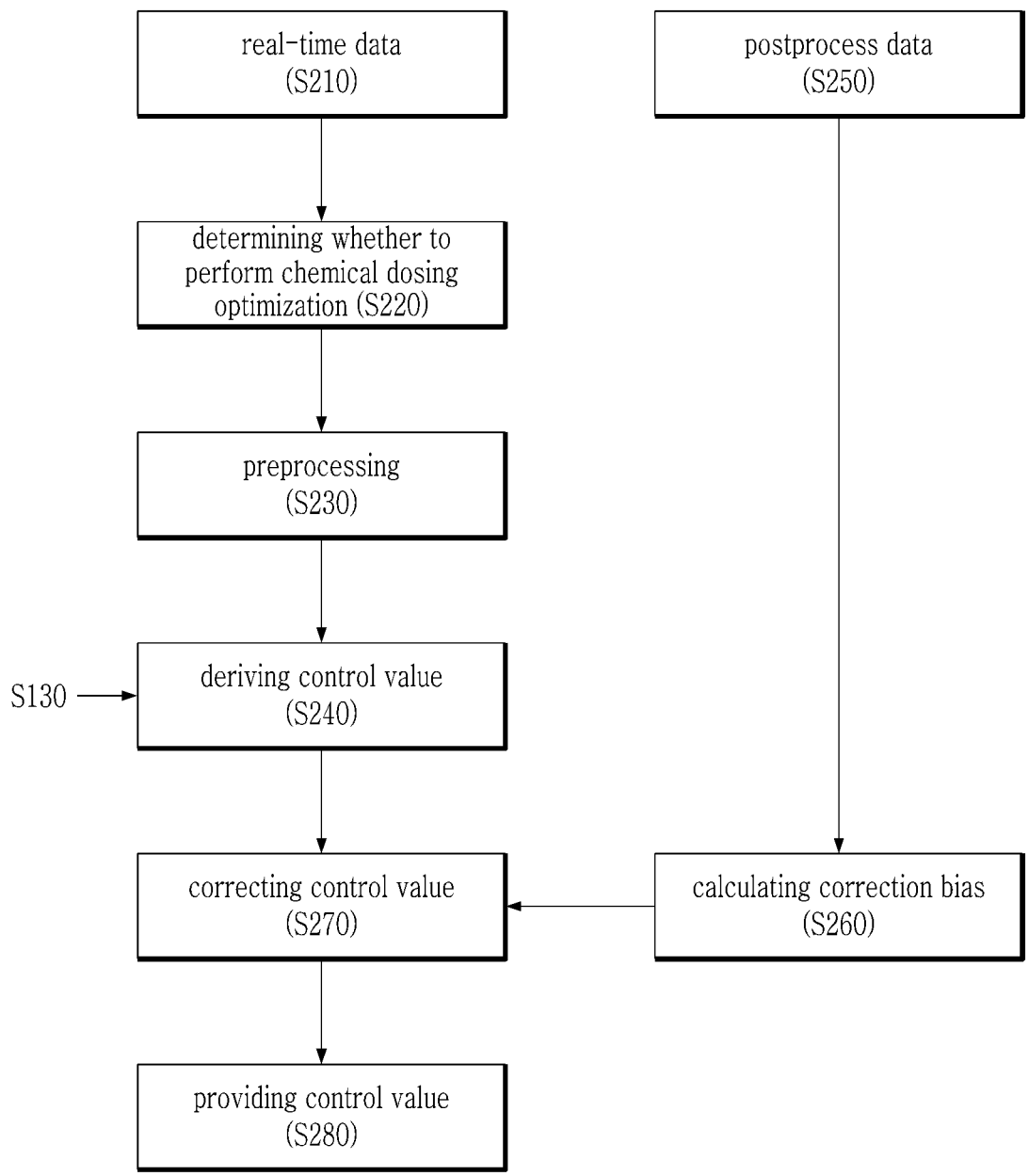
FIG. 11 is a flowchart illustrating a chemical dosing optimization method for a water treatment plant according to an additional embodiment of the present disclosure.

Next, a chemical dosing optimization method for a water treatment plant according to an additional embodiment of the present disclosure will be described. FIG. 11 is a flowchart illustrating the chemical dosing optimization method for a water treatment plant according to the additional embodiment of the present disclosure.

Referring to FIG. 11, a chemical dosing management part 100 may receive real-time data including operating data and state data in step S210. Then, the chemical dosing management part 100 may analyze the real-time data to determine whether a water treatment plant 1 is abnormal, and determines whether to perform chemical dosing optimization for optimizing a chemical dosage in step S220. When the water treatment plant 1 is normal and it is determined to perform chemical dosing optimization, a data preprocessing part 200 may preprocess the real-time data and provides the preprocessed real-time data to an optimization unit 10 including a chemical dosing optimization part 300 and a chemical dosing output control part 400 in step S230.

In the meantime, as described above, the optimization unit 10 may receive a water treatment model from a model generation and management unit 20. Accordingly, the chemical dosing optimization part 300 of the optimization unit 10 may analyze the real-time data through at least one water treatment model and at least one controller to derive a control value in step S240, wherein the control value is for dosing a minimum of a chemical dosage while the state of the treated water of the water treatment plant is maintained in a normal range. Herein, the controller may be a search algorithm. In addition, examples of the state of the treated water may include turbidity, acidity, residual iron, etc. In step S240, the at least one water treatment model may analyze the real-time data according to an input from the controller and derive a prediction value for predicting the state of the treated water of the water treatment plant, and the at least one controller may search for and derives a control value based on the prediction value of the water treatment model, wherein the control value is for dosing a minimum of a chemical dosage while the state of the treated water is maintained in the normal range. That is, a controller performs a simulation for predicting the state of the treated water of the water treatment plant through a water treatment model simulating the water treatment plant, thereby deriving an optimal control value.

In the meantime, the postprocess protection part 800 may receive postprocess data including the operating data and the state data of the late-stage process of the water treatment plant 1, specifically, the process performed by the automatic strainer (AS), the UF device, and the RO device, in step S250. The postprocess protection part 800 may analyze the received postprocess data to derive a correction bias value, and provides the correction bias value to the chemical dosing output control part 400 in step S260. The correction bias value is for protecting the postprocess according to a postprocess protection logic for preventing damage to the late-stage process, for example, a situation in which fouling occurs.

The chemical dosing output control part 400 may correct the control value according to the correction bias value and a control period and a control range of the water treatment control device 2 in step S270. Next, the chemical dosing output control part 400 may provide the control value derived by the chemical dosing optimization part 300 to the water treatment control device 2 according to a management command or a current state or both of the chemical dosing management part 100 in step S280. Herein, the chemical dosing output control part 400 may not provide the control value to the water treatment control device 2 according to the management command or the current state or both.

Figure 12:
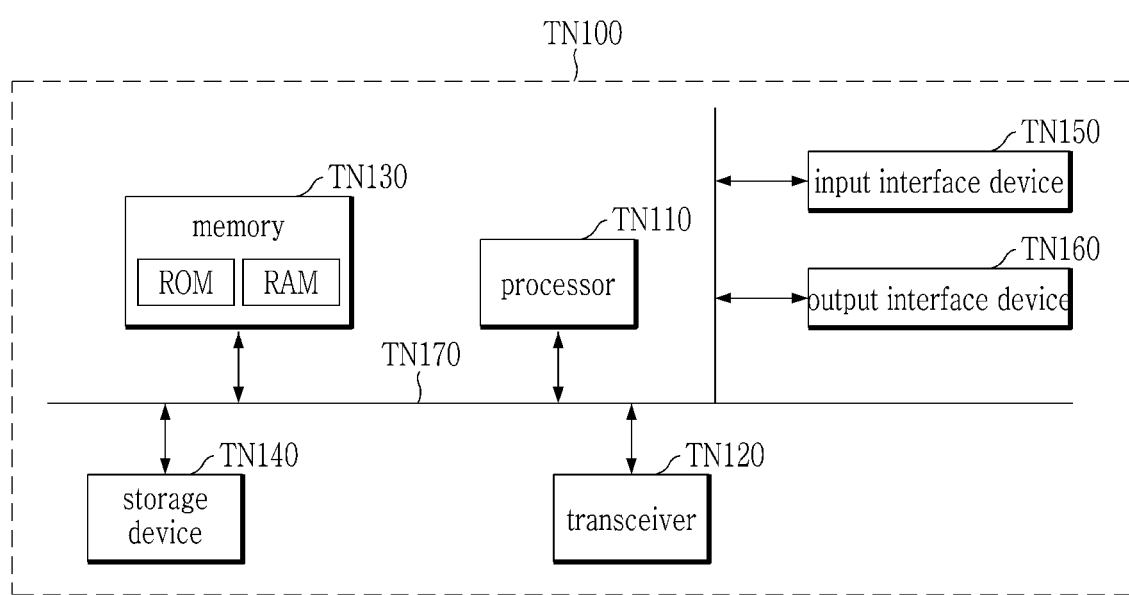
FIG. 12 is a diagram illustrating a computing device according to an embodiment of the present disclosure.

FIG. 12 is a diagram illustrating a computing device according to an embodiment of the present disclosure. A computing device TN100 may be the device or apparatus (for example, the water treatment control device 2 and the chemical dosing optimization apparatus 3) described in the present specification.

In the embodiment of FIG. 12, the computing device TN100 may include at least one processor TN110, a transceiver TN120, and a memory TN130. Furthermore, the computing device TN100 may include a storage device TN140, an input interface device TN150, and an output interface device TN160. The elements included in the computing device TN100 may be connected to each other via a bus TN170 to communicate with each other.

The processor TN110 may execute program commands stored in either the memory TN130 or the storage device TN140 or both. The processor TN110 may mean a central processing unit (CPU), a graphics processing unit (GPU), or a dedicated processor for performing the methods according to the embodiments of the present disclosure. The processor TN110 may be configured to realize the described procedures, functions, and methods related to the embodiments of the present disclosure. The processor TN110 may control each element of the computing device TN100.

Each of the memory TN130 and the storage device TN140 may store therein various types of information related to the operation of the processor TN110. Each of the memory TN130 and the storage device TN140 may be provided as either a volatile storage medium or a non-volatile storage medium or both. For example, the memory TN130 may be either a read only memory (ROM) or a random access memory (RAM) or both.

The transceiver TN120 may transmit or receive wired signals or wireless signals. The transceiver TN120 may be connected to a network to perform communication.

In the meantime, the various methods according to the above-described embodiments of the present disclosure may be implemented in the form of programs readable through various computer means and recorded on a computer-readable recording medium. Herein, the recording medium may include program commands, data files, data structures, and the like separately or in combinations. The program commands to be recorded on the recording medium may be specially designed and configured for embodiments of the present disclosure or may be well-known to and be usable by those skilled in the art of computer software. Examples of the recording medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. Examples of the program instructions include not only a mechanical language formatted by a compiler but also a high level language that may be implemented by a computer using an interpreter, and the like. The hardware devices may be configured to be operated by one or more software modules or vice versa to conduct the operation according to the present disclosure.

Although the embodiments of the present disclosure have been described, those skilled in the art will appreciate that addition, change, or deletion of elements may modify and change the present disclosure in various ways without departing from the spirit and scope of the present disclosure disclosed in the claims, and such modifications and changes also fall within the scope of the present disclosure. Also, it is noted that any one feature of an embodiment of the present disclosure described in the specification may be applied to another embodiment of the present disclosure.

The invention claimed is:

1. A water treatment control system controlling a water treatment plant which treats feed water, comprising:
   a transceiver configured to communicate with the water treatment plant;
   a memory configured to store a computer program; and
   at least one processor, upon executing the computer program, configured to perform a water treatment control operation and a chemical dosing optimization operation,
   wherein, in the water treatment control operation, the at least one processor is configured to control injection of a treatment chemical, which changes an ion concentration in the feed water, into the water treatment plant according to a predetermined control period and a predetermined control range,
   wherein, in the chemical dosing optimization operation, the at least one processor is configured to
      receive real-time data, from the water treatment plant,
      analyze the real-time data through a water treatment model in response to receiving the real-time data,
      derive a prediction value for predicting a state of the treated water of the water treatment plant,
      derive a control value based on the prediction value through a controller, such that the control value is to set a minimum of a dosage of the treatment chemical to be dosed in the feed water while the state of the treated water of the water treatment plant is maintained in a normal range, and
      convert the control value according to the predetermined control period of the water treatment control operation and the predetermined control range in each predetermined control period, and
   wherein the water treatment control operation is performed according to the converted control value resulting from conversion.

2. The water treatment control system of claim 1, wherein, in the chemical dosing optimization operation, the at least one processor is further configured to
   analyze postprocess data including operating data and state data of a process resulting from a late-stage process and derive a correction bias value for preventing damage to the late-stage process, and
   correct the control value according to the correction bias value.

3. The water treatment control system of claim 1, wherein, in the chemical dosing optimization operation, the at least one processor is further configured to receive the real-time data including operating data and state data from the water treatment plant, and analyze the received real-time data to determine whether to perform a chemical dosing optimization process for optimizing the dosage of the treatment chemical.

4. The water treatment control system of claim 3, wherein, in the chemical dosing optimization operation, the at least one processor is further configured to preprocess the real-time data.

5. The water treatment control system of claim 1, wherein, in the chemical dosing optimization operation, the at least one processor is further configured to
   design the water treatment model; and
   generate the water treatment model through training with training data extracted from raw data, the water treatment model simulating the water treatment plant and predicting the state of the treated water according to a state of the feed water for the water treatment plant.

6. The water treatment control system of claim 5, wherein, in the chemical dosing optimization operation, the at least one processor is further configured to
   use evaluation data collected from the water treatment plant to select the water treatment model having the highest similarity to the water treatment plant among a plurality of the generated water treatment models.

7. The water treatment control system of claim 1, wherein the water treatment model is configured to receive data indicative of a state of the feed water and the dosage of the treatment chemical derived by the controller, and calculate the prediction value for predicting the state of the treated water.

8. The water treatment control system of claim 7, wherein the controller is configured to receive the prediction value predicted by the water treatment model, and calculate the dosage of the treatment chemical considering a constraint limiting a range of the state of the treated water and an objective function for minimizing chemical dosing costs according to the prediction value.

9. A water treatment control system controlling a water treatment plant which treats feed water, comprising:
   a transceiver configured to communicate with the water treatment plant;
   a memory configured to store a computer program; and
   at least one processor, upon executing the computer program, configured to perform a water treatment control operation and a chemical dosing optimization operation,
   wherein, in the water treatment control operation, the at least one processor is configured to control injection of a treatment chemical, which changes an ion concentration in the feed water, into the water treatment plant according to a predetermined control period and a predetermined control range,
   wherein, in the chemical dosing optimization operation, the at least one processor is configured to
      generate a water treatment model through training with training data extracted from raw data received from the water treatment plant, the water treatment model simulating the water treatment plant and predicting a state of the treated water according to a state of the feed water for the water treatment plant,
      derive a prediction value for predicting the state of the treated water of the water treatment plant through the water treatment model,
      derive a control value based on the prediction value through a controller, such that the control value is to set a minimum of a dosage of the treatment chemical to be dosed in the feed water while the state of the treated water of the water treatment plant is maintained in a normal range, and convert the control value according to the predetermined control period of the water treatment control operation and the predetermined control range in each predetermined control period, and wherein the water treatment control operation is performed according to the converted control value resulting from conversion.

10. The water treatment control system of claim 9, wherein, in the chemical dosing optimization operation, the at least one processor is further configured to analyze postprocess data including operating data and state data of a process resulting from a late-stage process and derive a correction bias value for preventing damage to the late-stage process, and correct the control value according to the correction bias value.

11. The water treatment control system of claim 9, wherein, in the chemical dosing optimization operation, the at least one processor is further configured to receive real-time data including operating data and state data from the water treatment plant, and analyze the received real-time data to determine whether to perform a chemical dosing optimization process for optimizing the chemical dosage.

12. The water treatment control system of claim 9, wherein the water treatment model is configured to receive data indicative of the state of the feed water and the dosage of the treatment chemical derived by the controller, and calculate the prediction value for predicting the state of the treated water.

13. The water treatment control system of claim 12, wherein the controller is configured to receive the prediction value predicted by the water treatment model, and calculate the dosage of the treatment chemical considering a constraint limiting a range of the state of the treated water and an objective function for minimizing chemical dosing costs according to the prediction value.

14. A chemical dosing optimization method in a water treatment control system controlling a water treatment plant which treats feed water, the water treatment control system comprising a memory storing a computer program and at least one processor executing the computer program, comprising:

performing a water treatment control operation; and performing a chemical dosing optimization operation, wherein the water treatment control operation comprises controlling injection of a treatment chemical, which changes an ion concentration in the feed water, into the water treatment plant according to a predetermined control period and a predetermined control range, wherein the chemical dosing optimization operation comprises:

receiving, by the at least one processor, real-time data from the water treatment plant, analyzing, by the at least one processor, the real-time data through at least one water treatment model to derive a prediction value for predicting a state of treated water of a water treatment plant, deriving a control value based on the prediction value through a controller, the control value being for dosing a minimum of a dosage of a treatment chemical to be dosed in the feed water while the state of the treated water of the water treatment plant is maintained in a normal range, and converting the control value according to the predetermined control period of the water treatment control operation and the predetermined control range in each predetermined control period, and wherein the water treatment control operation is performed according to the converted control value resulting from conversion.

15. The method of claim 14, wherein the chemical dosing optimization operation further comprises:

analyzing postprocess data including operating data and state data of a process resulting from a late-stage process and deriving a correction bias value for preventing damage to the late-stage process and then correcting the control value according to the correction bias value.

16. The method of claim 14, wherein the chemical dosing optimization operation further comprises:

receiving the real-time data including operating data and state data from the water treatment plant, and analyzing the received real-time data to determine whether to perform a chemical dosing optimization process for optimizing the dosage of the treatment chemical.

17. The method of claim 16, wherein the chemical dosing optimization operation further comprises, after the determining of whether to perform the chemical dosing optimization process, and before the receiving of the real-time data:

preprocessing the real-time data by a data preprocessing part.

* * * * *